(12) United States Patent
Parish et al.

(10) Patent No.: US 10,487,445 B2
(45) Date of Patent: Nov. 26, 2019

(54) SPRAY APPLIED INSULATIVE AND PROTECTIVE COATING

(71) Applicant: THE SHERWIN-WILLIAMS COMPANY, Cleveland, OH (US)

(72) Inventors: David M Parish, Shaker Heights, OH (US); Patrick D Ziemer, Garfield Heights, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 15/152,584

(22) Filed: May 12, 2016

(65) Prior Publication Data

US 2017/0327711 A1    Nov. 16, 2017

(51) Int. Cl.
| | | |
|---|---|---|
| *D06M 15/00* | (2006.01) | |
| *C08G 77/445* | (2006.01) | |
| *C03C 25/40* | (2006.01) | |
| *C03C 25/1095* | (2018.01) | |
| *C08F 290/14* | (2006.01) | |

(52) U.S. Cl.
CPC .......... *D06M 15/00* (2013.01); *C03C 25/1095* (2013.01); *C03C 25/40* (2013.01); *C08F 290/148* (2013.01); *C08G 77/445* (2013.01)

(58) Field of Classification Search
CPC ....... C09D 143/04; B05D 1/02; C08F 230/08; F16L 59/028; F16L 59/14
USPC .......................................... 526/205
See application file for complete search history.

(56) References Cited

U.S. PATENT DOCUMENTS

2007/0117917 A1\*   5/2007   Herr .................. C08G 59/24
                                                    524/556

\* cited by examiner

*Primary Examiner* — William K Cheung
(74) *Attorney, Agent, or Firm* — Vivien Y. Tsang

(57) ABSTRACT

An inorganic and organic insulating polymer comprising a methyl phenyl silicone polyester with a thixotropic index from about 6 to about 9 that is effective to gel and cure very quickly so that the polyester can be applied, such as by spraying, to a pipe or other object to provide insulation and protection without sagging or deformation.

11 Claims, No Drawings

SPRAY APPLIED INSULATIVE AND PROTECTIVE COATING

FIELD

Materials and methods for providing a barrier to surfaces wherein the barrier provides insulation, thermal protection, and weather resistance are disclosed herein.

BACKGROUND

Providing insulation and thermal protection to pipes and conduits throughout industrial facilities is often important to maintain efficiency in material transfer and safety to the workers in the facilities. There are a plethora of areas and industries where pipes, tanks, and other structures need to be protected and insulated including those found in the petrochemical, oil, and gas industries to suggest but a few.

For insulation and thermal protection, the industry standard is generally to use a mineral wool wrap to cover the pipe or other object being insulated and then provide a metal cladding over the top of the insulation wrapping to hold the insulation in place. The process of wrapping and then cladding the pipe or other object is very time and labor intensive and, because of these considerations, such wrapping and cladding process is somewhat costly. Conventional spray insulation products are generally unsuitable for insulating and weather protection to pipes and other objects because existing spray products are generally designed for application to or within a defined cavity to be effective and to hold its final shape. Applying conventional spray insulation products to a pipe typically does not result in the material providing an effective weather and insulation coating.

Many pipes that are wrapped in the mineral wool and then clad in metal are located outside of a facility's walls and are, thus, exposed to a variety of different temperature and weather conditions, such as rain, snow, humidity, moisture, debris, and the like. Because the mineral wool, which is used to insulate the piping is porous and because the cladding typically does not cover the entire mineral wool wrap or can otherwise have areas exposed to the surroundings, environmental exposure to debris and moisture causes unwanted decreases to the insulation properties of the mineral wool as well as deterioration of the underlying pipe itself due to possible moisture penetration. The deterioration of the pipe due to unwanted water penetration, called Corrosion Under Insulation (or CUI), is an undesired problem as CUI is a relatively major expense at many industrial facilities in terms of both maintenance and part replacement.

Prior attempts to address the issues mentioned herein with mineral wool insulation have been through a coating that can be applied to pipes to provide the insulation and thermal protective properties while also being relatively non-porous and preventing exposure of the pipes to moisture. Prior coating products are typically water-based and must be applied in relatively thin coats onto a hot surface (such as about 190° F. to about 210° F. or about 200° F.) for the coatings to properly adhere to the pipes. As the products are water based, the water must be removed to form the final product, which can cause challenges in maintaining a uniform coating on the pipe or other object as the coating is dried, which can be hindered by high ambient humidity levels. Further, existing products generally require thin, multiple coats to achieve the thickness required to provide adequate insulation and thermal protective properties to the pipes, thus causing the application of this insulation to be just as, if not more, labor intensive than wrapping and cladding traditional mineral wool.

BRIEF DESCRIPTION OF THE INVENTION

According to one aspect, the subject application involves an inorganic and organic insulating polymer comprising a methyl phenyl silicone polyester with a thixotropic index from about 6 to about 9. The polyester is a polymerized reaction product between a multifunctional silicone acrylate or silicone methacrylate having a reactive functionality greater than 3 and one or more multifunctional acrylate or methacrylate monomers in the presence of an initiator and, in some approaches, also a reducer. In one approach, the polyester has a weight average molecular weight of about 2,000 to about 6,500. In another approach, the methyl phenyl silicone polyester gels within about 30 to about 60 seconds and cures within about 40 to about 80 total seconds so that it can preferably be spray applied to a pipe or other object to provide insulation and protection without sagging or deformation.

According to another aspect, the multifunctional silicone acrylate or silicone methacrylate is the product of a reaction between a multifunctional silicone polyol with a reactive functionality of greater than about 3 to about 8 and acrylic or methacrylic acid at a temperature from about 80° C. to about 150° C., and in other approaches, 100° C. to about 120° C. and in the presence of a catalyst and stabilizer to provide a controlled reaction. In one approach, the catalyst is one or more organic acids and the stabilizer is one or more phenolic compounds. In other approaches, the catalyst includes a strong acid and a weak acid. In yet another approach, the one or more phenolic compounds include t-butyl hydroquinone.

According to another aspect, the one or more multifunctional acrylate or methacrylate monomers are selected from a cyclic ether acrylate, a cyclic ether methacrylate, alkoxy acrylates, alkoxy diacrylates, alkoxy methacrylates, alkoxy dimethacrylates, and combinations thereof. In another aspect, the one or more multifunctional acrylate or methacrylate monomers are selected from 1,4-butanediol diacrylate or dimethacrylate, tetrahydrofurfuryl acrylate or methacrylate, and combinations thereof.

According to yet another aspect, the initiator is a peroxide, and preferably in another aspect, benzoyl peroxide.

According to another aspect, the polyester includes about 10% to about 30% weight percent silicone.

According to another aspect, the subject application involves a method of applying art inorganic and organic insulating polymer to an object to provide insulation and protection. By one approach, the method includes reacting a multifunctional silicone acrylate or silicone methacrylate having a reactive functionality greater than about 3 and one or more multifunctional acrylate or methacrylate monomers in the presence of an initiator and, in some approaches, also a reducer to form a methyl phenyl silicone polyester having a thixotropic index from about 6 to about 9. The methyl phenyl silicone polyester may be applied, such as by spraying, to the object in an amount to provide insulation wherein the methyl phenyl silicone polyester gels in about 30 to about 60 seconds and cures within about 40 to about 80 total seconds. The polyester may be applied without sagging and deformation to the outer surfaces of the object and not within a defined cavity. In some approaches, the applying includes spraying, pumping through static mix heads, brushing, coating, application via a spatula or other applicator, and combinations thereof.

According to other aspects of the method, the methyl phenyl silicone polyester has a weight average molecular weight of about 2,000 to about 6,500.

According to others aspects of the method, the multifunctional silicone acrylate or silicone methacrylate is the product of a reaction between a multifunctional silicone polyol with a reactive functionality of greater than about 3 to about 8 and acrylic or methacrylic acid at a temperature from about 80° C. to about 150° C. (and, in other approaches, about 100 to about 120° C.) and in the presence of a catalyst and stabilizer. In some approaches, the catalyst is one or more organic acids and the stabilizer is one or more phenolic compounds. In other approaches, the catalyst includes a strong acid and a weak acids, and in yet other apaches, the one or more phenolic compounds include t-butyl hydroquinone.

In other aspects of the methods, the one or more multifunctional acrylate or methacrylate monomers are selected from a cyclic ether acrylate, a cyclic ether methacrylate, alkoxy acrylates, alkoxy diacrylates, alkoxy methacrylates, alkoxy dimethacrylates, and combinations thereof. In some approaches, the one or more multifunctional acrylate or methacrylate monomers are selected from 1,4-butanediol diacrylate or dimethacrylate, tetrahydrofurfuryl acrylate or methacrylate, and combinations thereof.

In other aspects of the methods, the initiator is a peroxide and, preferably, benzoyl peroxide.

In yet other aspects of the methods, the polyester includes about 10% to about 30% weight percent silicone.

The above summary presents a simplified summary in order to provide an insulation including at least a multifunctional silicone acrylate methacrylate and one or more multifunctional acrylates or methacrylates to form an organic-inorganic polymer insulating polymer suitable for pipes, conduits and other objects to provide insulation and protection.

DETAILED DESCRIPTION

The present disclosure is generally directed to spray insulating polymer coatings suitable for application to pipes, conduits, tanks, and other objects to provide insulation and protection from environmental exposure and the like. The spray insulating polymer coatings described herein may be used to cover pipes and other irregularly shaped objects, does not need to be applied or contained within defined cavities, and provides adequate insulation, heat protection, and weather protection to the pipes or other objects being covered. The material is non-aqueous, relatively easy to apply and, if sprayed on, cures in such a way and in an effective time to provide adequate properties in a single, relatively thick application or coating.

In one approach or embodiment, the insulating polymer is a methyl phenyl silicone polyester having a thixotropic index from about 6 to about 9, a gel time of about 30 to about 60 seconds, and a cure time of about 40 to about 80 total seconds. The polymer insulation is non-aqueous or a non-water based polymer that can be applied, such as spray applied, in a single coating or application at thicknesses of at least about 1 inch thick and achieves an insulation R-value comparative to 3 to 4 inches of prior (wet) mineral wool wrapping. In some approaches, the spray insulating polymer coatings herein exhibit an R-value of greater than about 2 ft2*° F.*h/BTU, in other approaches, about 2 about 8 ft2*° F.*h/BTU, and in yet other approaches, about 2 to about 4 ft2*° F.*h/BTU. The polymer composition and thixotropic index as well as the gel and cure times are effective so that the polymer can be applied at the desired thickness without sagging or deformation (and without being applied or spray within a defined space or cavity). The polymers herein demonstrate good adhesion directly to metal or to a primer coated metal object. The polymers have good weathering capabilities, chemical resistance, and long term durability in an industrial environment. In some approaches, the cured coating can be top coated if desired for a particular application.

Certain terminology is used herein for convenience only and is not to be taken as a limitation on the present disclosure. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

Glossary of Terms

"Insulation" or "thermal insulation" as used herein refers to the ability of a material to reduce the transfer of thermal energy between objects or areas of different temperature. In some embodiments, the efficacy of thermal insulation may be quantified by an R-value.

"R-value" as used herein refers to a measure of thermal resistance that is commonly used in the building and construction industry. The R-value measures the ratio of a temperature difference across an insulator and the heat flux through the insulator by the formula: R-value=d/λ or d*Ra wherein d is the thickness of the insulator, λ is the thermal conductivity, and Ra is the thermal resistivity, which is the inverse of thermal conductivity. Thermal conductivity is typically measured in W/(m*K), thermal resistivity is typically measured in ft2*° F.*h/BTU/inch, thickness in inches, and thermal resistance (R-value) is ft2*° F.*h/BTU.

"Pipe" as used herein refers generically to any surface or object. In certain non-limiting embodiments, a pipe may refer to any length of material which has a hollow core that may be used to facilitate the movement of gases or fluids from a first point to a second point. A pipe may be straight, curved, or may have any number of irregularities in its shape. In some embodiments, a pipe may be surrounded by another object which forms a defined cavity therebetween. In other embodiments, a pipe may have nothing around it. A pipe may be made of metal, plastic, glass, or combinations thereof. The pipe may be metal or have a metal outer surface. If the insulation is applied in a shop, surface preparation would be consistent to SP5 standards (i.e., white metal blast), and this would primarily be for steel/gray iron piping, tankage, etc. In the field, surface preparation would be a standard field prep to SP5-SP10 standards (i.e., white metal blast, commercial blast, brush off blast, or near-white blast), and would be similar steel/gray iron piping, tankage, etc.

"Corrosion Under Insulation" or "CUI" as used herein refers to the corrosion or other wear that occurs when a pipe (such as a metal pipe) is exposed to moisture and heat. CUI may be any type of corrosion that occurs due to moisture buildup on the external surface of insulated equipment, which may be caused by multiple factors. In some instances, the corrosion is galvanic, chloride, acidic, or alkaline corrosion. CUI may be determined or inspected according to conventional standards of the American Petroleum Institute Code as understood by those of ordinary skill.

"Personal Protection" as used herein refers to a specific type of insulating capability wherein the insulating material (such as a wrap or coating) prevents the transfer of heat from a pipe (or other material) being insulated to an object that comes into contact with the exterior of the insulation—for example, the hand of a person touching the insulated pipe. In one approach, the insulating coatings herein are heat resistant to a minimum of about 450° F. and, preferably, up to, or in some cases, greater than about 1000° F.

"Fast curing" or "fully cured" as used herein refers to curing within a total time after application from about 40 to about 80 seconds, preferably 40 to about 60 seconds, and more preferably, about 40 to about 45 seconds or cured materials within such times. Cure time includes gel time—as discussed below. Cure is measured or determined by hardness development as tested by a Barcol Hardness test using Barcol 934-01 impresser (Barber-Colman). Hardness is tested per one or more of the ASTM standards E140-97, D2583-75, B648-78, E140-97, D2383-75, or B648-78. Hardness testing relates to a depth of penetration of a needle into the material. The Barcol Hardness test commonly involves an instrument with a 0-100 scale with each increment equal to approximately 0.0076 mm (0.0003 inches). For purposes herein, a Barcol reading of about 60 (an indentation of about 0.456 mm) indicates an initial cure, and a Barcol reading of about 80 (an indentation of about 0.608 mm) indicates a full or fully cured polymer.

"Gel time" or "gelled" as used herein may refer to an initial gel time with about 6 weight percent initiator. By one approach, initial gel time may be about 30 to about 60 seconds, in other approaches, about 30 to about 40 seconds, and in yet other approaches, about 30 to about 35 second. Gelled may refer to a material that has gelled within those time limits. Gelling is measured or determined by loss of liquidity (i.e., turning from a liquid to a gelatinous solid). Gel is commonly measured with a Tecam Gel timer (Paul N. Gardner Co., Inc.), which measures a spindle turning in the material until the formation of gel stops the spindle and in which a timer is also stopped automatically at that time. Gel time is measured using the supplied wire stirrer of the Tecam Gel tester and any paper cup. The device rotates the wire stirrer at 20 rpms in the catalyzed material. As gelation occurs, drag eventually exceeds motor torque, and the Tecam Gel timer motor stalls. The unit automatically stops a timer when the motor stalls. The displayed time is the gel time.

"Thixotropic" or "Thixotropic index" as used herein refers to a time-dependent shear thinning property. Certain materials such gels or fluids that are thick (viscous) under static conditions will flow (become thin, less viscous) over time when shaken, agitated, sheared or otherwise stressed. A thixotropic material will take a certain amount of time to return to a more viscous state after it has been stressed. The materials herein exhibit a viscosity at rest in the range of about 15,000 to 25,000 cps, and a dynamic viscosity from about 1,000 cps to about 4,000 cps. Thixotropic index is the ratio of rest viscosity to dynamic viscosity, and for the materials herein, the thixotropic index for the catalyzed polymers is about 6 to about 9.

"Composition" as used herein refers to a composition having fillers, thixotropes, defoamers, promoters, wetting agents, polymer monomers, and other conventional additives that are formulated into the resin system that may provide one or more of the chemical reactions that takes place when the initiator is added to the base system, and in the presence of the other ingredients allow for the complete characteristics development.

The present disclosure is directed to compositions and methods for the application of an inorganic-organic polymer and protective coverings to pipes and other objects. While several specific embodiments are discussed herein, it is understood that the present disclosure is to be considered only as an exemplification of the principles of the invention and is not intended to limit the disclosure to the embodiments illustrated.

In one non-limiting embodiment, a composition may be spray applied by a consumer using a conventional spray gun, such as those provided by Graco or Binks, to a pipe or other object to provide the desired properties. Application pressures may be about 2,000 to about 5,000 psi, in other approaches, about 2,000 to about 3,500 psi, and in yet other approaches, about 2,000 to about 3,000 psi. Tip size of the spray gun may be about 0.03 to about 0.046 inches depending on the ambient temperature.

In some embodiments, any of the catalyzed polymer compositions herein may be applied to a pipe or other object in a thickness of at least about 1 inch, in some approaches, about 1 to about 4 inches, in other approaches, about 2 inches to about 3 inches, and in yet other approaches, about 3 to about 4 inches (a preferred thickness is about 1 inch). In another non-limiting embodiment, a pipe is first prepared with the surface preparation standards as stated previously. The composition may be spray applied to the pipe at a thickness of at least 1 inch and wherein the composition preferably gels within about 30 seconds or less and preferably cures within about 40 total seconds or less; however, other gel and cure times may be experienced depending on the application and composition. In some approaches, the cured composition provides a reduction of heat transfer up to about 95%, such as about 50 to about 95%, and more preferably, about 75 to about 95% as compared to a non-insulated object. In one non-limiting approach, reduction of heat transfer at about 60 mils is about 21% as compared to about 42% reduction at a thickness of 125 mils. Another non-limiting approach, a reduction of heat transfer at about 180 mils is about 64% as compared to about 84% at a thickness of 240 mils or approximately ¼ of an inch. The reduction in heat transfer is compared to an uncoated or non-insulated (bare) substrate.

Formulation of the Composition

The composition of the present invention may be formulated by providing a multifunctional silicone acrylate or silicone methacrylate having a reactive functionality greater than about 3 and polymerizing the silicone acrylate or silicone methacrylate with one or more multifunctional acrylate car methacrylate monomers in the presence of an initiator and, in some cases, a reducer to form a methyl phenyl silicone polyester insulating and protective coating. The composition is preferably a dual component system with an external catalyst to initiate the polymerization. The composition can be spray applied in slow even passes wet on wet until the desired film thickness is achieved. Further details on polymer formation are provided below when each of the polymer components is introduced. The composition may also include optional additives and other functional components as needed for a particular application.

Composition

Non-limiting illustrative formulations of the composition include a polymerized reaction product between a multi-functional silicone acrylate or silicone methacrylate monomer having a reactive functionality greater than about 3 and one or more multifunctional acrylate or methacrylate monomers in the presence of an initiator. The composition forms a methyl phenyl silicone polyester having, among other features, a thixotropic index from about 6 to about 9 and about 10 to about 30 weight percent silicone (in other approaches, about 20 to about 30% silicone) within the polymer matrix. The composition is preferably non-aqueous and, in some approaches, has a moisture content less than about 1 weight percent, in other approaches, less than about 0.5 weight percent, and in yet other approaches, less than about 0.1 weight percent, and in yet further approaches, little to no unbound water that needs to be removed during drying. In other approaches, the composition has a weight average molecular weight of about 2,000 to about 6,500, in other approaches, about 2,000 to about 3,000, and in yet other approaches, about 2,000 to about 2,500. The composition gels and cures in the times mentioned previously, and a cured composition exhibits the insulation properties as discussed above.

Turning to more of the specifics, the insulating polymer includes the multifunctional silicone acrylate or silicone methacrylate monomer co-polymerized into the polymer with one or more other monomers. This silicone acrylate or silicone methacrylate monomer is the reaction product of a multifunctional silicone polyol having a reactive functionality of greater than about 3 to about 8 and an acrylic or methacrylic acid in the presence of a catalyst and inhibitor/stabilizer. The reaction proceeds at a much lower temperature than conventional reactive acrylates and is approximately 40° C. to about 50° C. lower than other reactive acrylates. By one approach, the reaction temperature is about 80° C. to about 150° C., in other approaches, about 100° C. to about 120° C., and in yet other approaches, about 110° C. to about 115° C. The silicone polyol is an inorganic/organic derivative having at about 10 to about 30 percent silicone (in other approaches about 20 to about 30% silicone). In one approach, the silicone polyol is represented by the formula:

wherein R may be an aliphatic silicone moiety or a silicone modified by a polyester, polyether, urethane, epoxy, or other organic group, and n may be an integer greater than 3 and up to 8 and, preferably, greater than 3 and up to 6. In one approach, the silicone polyol may be Silikotop E900 or E901 (Evonik Industries). Preferably, about 65 to about 90 weight percent (in other approaches, about 70 to about 80 weight percent) of the silicone polyol is reacted with the acrylic or methacrylic acid to form the silicone acrylate or methacrylate monomer.

By one approach, about 10 to about 30 weight percent of the acrylic or methacrylic acid is reacted with the silicone polyol. Alternatively, the acrylic or methacrylic acid may be an acrylate or methacrylate ester, or any compound containing a polymerizable double bond attached to a functional group that can react with the silicone polyol.

The silicone polyol and methacrylic acid are reacted in the presence of one or more catalysts and an inhibitor/stabilizer selected to achieve a controlled reaction at the lower reaction temperatures mentioned above. By one approach, the catalyst is one more organic acids and the stabilizer is one or more phenolic compounds. By one approach, the catalyst includes a blend of a strong acid and a weak acid. For example, strong acids may be selected from sulfonic acid, p-toluene sulfonic acid or other strong acids known in the art. Weak acids may be selected from hypophosphorous acid (50%) or other weak acids known in the art. The inhibitor or stabilizer may be selected from tert-butyl hydroquinone, methyl hydroquinone, tert-butyl catechol, phenothiazine or other free radical scavengers known in the art. In one approach, the reaction composition may include about 1 to about 3 percent of the strong acid, and in other approaches, about 1.3 to about 2 percent, and in other approaches, about 1.5 to about 2 percent of the strong acid. The weak acid may be used in about 0.05 to about 0.1 weight percent. In some approaches, there is at least 10 to 30 times more strong acid to weak acid to achieve the reaction product. The inhibitor or stabilizer may be used in about 50 to about 500 parts per million by weight.

The resultant silicone acrylate or silicone methacrylate monomer obtained from the above described reaction has the general structure

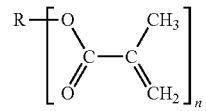

wherein R may be an aliphatic silicone moiety or a silicone modified by a polyester, polyether, urethane, epoxy, or other organic group, and n may be an integer greater than 3 and up to 8 and, preferably, greater than 3 and up to 6. In one approach, the acid value of the resultant monomer is about 5 to about 11.

The silicone acrylate or silicone methacrylate monomer is then polymerized with one or more multifunctional acrylate or methacrylate monomers in the presence of a reducer and initiator to form the insulating polymer. The multifunctional acrylate or methacrylate monomers suitable for the polymerization reactions herein include mono-, di-, or polyfunctional acrylate esters, methacrylate esters, or the like.

Useful monofunctional acrylates, methacrylates include, but are not limited to, monomers and oligomers of alkyl acrylate, aralkyl acrylate, cycloalkyl acrylate, alkoxy acrylate, cycloalkoxy acrylate, bicycloalkyl acrylate, alkoxy (alkoxy)$_n$ acrylate, alkyl methacrylate, polyalkene(meth)acrylate, aralkyl methacrylate, cycloalkyl methacrylate, alkoxy methacrylate, bicycloalkyl methacrylate, cycloalkoxy methacrylate, and alkoxy (alkoxy)$_n$ methacrylate. The alkyl moieties may be selected of 1 to 16 carbons, the cycloalkyl moieties from 4 to 8 carbons, and n is an integer from 1 to 6.

In some approaches, monofunctional acrylates or methacrylate can be selected from, but not limited to, n-pentyl acrylate, 2-methyl butyl acrylate, 2-ethylhexyl acrylate, n-octyl acrylate, n-decyl acrylate, n-dodecyl acrylate, lauryl methacrylate, lauryl acrylate, stearyl acrylate, stearyl methacrylate, 2-ethylhexyl methacrylate, n-octyl methacrylate, iso-octyl acrylate, iso-octyl methacrylate, isononyl acrylate, isodecyl acrylate, isobornyl acrylate, isobornyl methacrylate, 2-ethoxy ethyl methacrylate; butyl diglycol methacrylate; tetrahydrofurfuryl acrylate; tetrahydrofurfuryl methacrylate; furfuryl methacrylate 2-phenoxyethyl acrylate, isohexyl acrylate; tridecyl acrylate; tridecyl methacrylate; ethoxylated nonyl phenol acrylate and the like and mixtures thereof.

Suitable di-functional monomers for example can be selected from, but not limited to, the group of monomers and oligomers comprising or consisting of alkene glycol dimethacrylate, alkyl dimethacrylate, alkyldiol dimethacrylate, alkoxy alkanol diacrylate, trialkanol triacrylate, alkoxy (alkoxy)$_n$ alkyl triacrylate, alkoxy (alkoxy)$_n$ alkyl dimethacrylate, aralkyl dimethacrylate, cycloalkyl dimethacrylate, alkoxy dimethacrylate, bicycloalkyl dimethacrylate, cycloalkoxy dimethacrylate, alkene glycol diacrylate, alkyl diacrylate, alkyldiol diacrylate, alkoxy alkanol dimethacrylate, trialkanol trimethacrylate, alkoxy (alkoxy)$_n$ alkyl trimethacrylate, alkoxy (alkoxy)$_n$ alkyl diacrylate, aralkyl diacrylate, cycloalkyl diacrylate, alkoxy diacrylate, bicycloalkyl diacrylate, cycloalkoxy diacrylate, wherein the alkyl and alkene moieties are of 1 to 16 carbons, the cycloalkyl moieties are of 4 to 8 carbons, n is an integer from 1 to 6.

In some approaches, the monomers can be selected from, but not limited to, any of hexyl dimethacrylate; triethylene glycol dimethacrylate; ethylene glycol dimethacrylate; tetraethylene glycol dimethacrylate; polyethylene glycol dimethacrylate; 1,3 butylene glycol diacrylate; 1,5-butanediol dimethacrylate; 1,4-butanediol diacrylate; diethylene glycol diacrylate; diethylene glycol dimethacrylate; 1,6 hexanediol diacrylate; 1,6 hexanediol dimethacrylate; neopentyl glycol diacrylate; neopentyl glycol dimethacrylate, polyethylene glycol diacrylate; tetraethylene glycol diacrylate; triethylene glycol diacrylate; 1,3 butylene glycol dimethacrylate; tripropylene glycol diacrylate; ethoxylated bisphenol diacrylate; ethoxylated bisphenol dimethyacrylate; dipropylene glycol diacrylate; alkoxylated hexanediol diacrylate; alkoxylated cyclohexane dimethanol diacrylate; propoxylated neopentyl glycol diacrylate, trimethylolpropane trimethacrylate; trimethylolpropane triacrylate, pentaerythritol triacrylate, ethoxylated trimethylolpropane triacrylate, propoxylated trimethylolpropane triacrylate, propoxylated glyceryl triacrylate, ditrimethylolpropane tetraacrylate, dipentaerythritol pentaacrylate, ethoxylated pentaerythritol tetraacrylate, and the like, and mixtures thereof.

The polymerization occurs in the presence of a reducer and initiator. By one approach, the reducer may be dimethyl para toluidine (DMPT), (DMA) Dimethyl (MHPT) Methyl Hexyl para toluidene, (DEA) Diethyl Aniline and combinations thereof, and preferably, is DMPT. The initiator may be a peroxide and, in some approaches, benzoyl peroxide, methyl ethyl ketone peroxide (METP), (CHP) Cumene Hydro Peroxide or combinations thereof. In some approaches, about 0.4% to about 2.0% percent reducer and about 3.0% to about 6.0% percent initiator may be used in the polymerization reaction.

The resultant methyl phenyl silicone polyester may be combined with other additives as needed for a particular application. Suitable additives may include thermal fillers such as silica based fillers, hollow glass microspheres, and barium sulfate; defoamers, such as (PDMS) poly dimethyl silicone; and hollow glass microspheres. These and other additives can be added in amounts conventional for spray applications and insulating purposes.

Properties of the Composition

In some approaches, the resultant polymer preferably has a viscosity of about 1000 cps to about 1400 cps. The polymer is non-Newtonian and exhibits a thixotropic index of about 6.5 to about 9, in other approaches, about 7.5 to about 9, and in yet other approaches, about 8 to about 9. Gelling can be achieved in about 30 to about 60 seconds, in some approaches, about 30 to about 40 seconds, and in yet other approaches, about 30 to about 35 seconds. Full cure at ambient temperatures (approximately 20° C. to about 25° C.) can be achieved in about 40 to about 80 total seconds, in some approaches, about 40 to about 60 total seconds, and in yet other approaches, about 40 to about 45 total seconds. Cure times includes the gel times. Preferably, the peak exotherm is reached in about 5 to about 15 seconds, and preferably about 10 seconds.

The polymers of the present disclosure may also exhibit an R-value of about 2 to about 8 $ft^{2*°}$ F.*h/BTU (thickness of 1 to 4 inches) and a thermal resistivity of about 1 to about 3.5 $ft^{2*°}$ F.*h/BTU/inch.

Comparative Data

Mineral wool typically exhibit a varied thermal resistance (R-value) at 4 inches of thickness depending on the humidity and moisture uptake levels. Typical results are found below in Table 1.

TABLE 1

Typical Mineral Wool Thermal Resistance, (R-value) $ft^2 * ° F. * h/BTU$

| Component | Approximate R-value |
|---|---|
| Mineral Wool, 30° C., dry | 14.25 |
| Mineral Wool, 30° C., 10 volume % water uptake | 3.75 |
| Mineral Wool, 30° C., 20 volume % water uptake | 3.0 |
| Mineral Wool, 70° C., dry | 12.5 |
| Mineral Wool, 70° C., 10 volume % water uptake | 1.25 |
| Mineral Wool, 70° C., 10 volume %, water uptake | 1.0 |

An exemplary composition of the present disclosure exhibits a reduction of heat transfer at about 60 mils of about 21% as compared to the bare steel with no material on it. In another instance, an exemplary composition of the present disclosure exhibits a reduction of heat transfer at about 180 mils (~⅛ inch) about as compared to the bare steel with no material on it. In addition, R-values of polymer insulation of the present disclosure is typically 2 to 4 $ft^{2*°}$ F.*h/BTU at 1 inch thickness (and preferably 1 to 4 inches of thickness).

EXAMPLES

A better understanding of the present disclosure and its many advantages may be clarified with the following examples. The following examples are illustrative and not limiting thereof in either scope or spirit. Those skilled in the art will readily understand that variations of the components, methods, steps, and devices described in these examples can be used. Unless noted otherwise, all percentages, ratios, and parts noted in this disclosure are by weight.

Example 1

An exemplary methyl phenyl silicone polyester of the present disclosure was compared to conventional mineral wool insulation. An inventive polyester was compared to mineral wool at various water uptake levels. Table 3 below provides thermal resistivity (Ft2*F*h/BTU/inch) and R-value.

TABLE 3

| Material | Thermal Resistivity | R-Value |
|---|---|---|
| Inventive coating | 2.0 | 8.0 |
| Mineral Wool, 30 C., dry | 3.5 | 14.0 |
| Mineral Wool, 30 C., 10 volume % water uptake | 1.0 | 4.0 |
| Mineral Wool, 30 C., 20 volume % water uptake | 0.7 | 2.8 |
| Mineral Wool, 70 C., dry | 3.3 | 13.2 |
| Mineral Wool, 70 C., 10 volume % water uptake | 0.25 | 1.0 |
| Mineral Wool, 70 C., 10 volume %, water uptake | 0.25 | 1.0 |

Unless otherwise specified, all measurements herein are made at 23±1° C. and 50% relative humidity.

All publications, patent applications, and issued patents mentioned herein are hereby incorporated in their entirety by reference. Citation of any reference is not an admission regarding any determination as to its availability as prior art to the claimed invention.

The dimensions and values disclosed herein are not to be understood as being strictly limited to the exact numerical values recited, instead, unless otherwise specified, such as dimension is intended to mean both the recited value and a functionally equivalent range surrounding that value. For example, a dimension disclosed as "40 mm" is intended to mean "about 40 mm".

While particular embodiments of the present invention have been illustrated and described, it would be obvious to those skilled in the art that various other changes and modifications can be made without departing from the spirit and scope of the invention, it is therefore intended to cover in the appended claims all such changes and modifications that are within the scope of this invention.

We claim:

1. An inorganic and organic insulating polymer comprising a methyl phenyl silicone polyester having a thixotropic index from about 6 to about 9 that is a reaction product of (a) a multifunctional silicone acrylate or silicone methacrylate having a reactive functionality greater than about 3, that is a reaction product of (i) a multifunctional silicone polyol with a reactive functionality of greater than 3 to about 8, and (ii) acrylic or methacrylic acid; and (b) one or more multifunctional acrylate or methacrylate monomers in the presence of an initiator; and about 10 to about 30 weight percent silicone.

2. The inorganic and organic insulating polymer of claim 1, further having a weight average molecular weight of about 2,000 to about 6,500.

3. The inorganic and organic insulating polymer of claim 1, wherein the methyl phenyl silicone polyester gels within about 30 to about 60 seconds and cures within about 40 to about 80 total seconds.

4. The inorganic and organic insulating polymer of claim 1, wherein the reaction between the multifunctional silicone polyol with a reactive functionality of greater than about 3 to about 8 and the acrylic or methacrylic acid further comprises a catalyst and stabilizer.

5. The inorganic and organic insulating polymer of claim 4, wherein the catalyst is one or more organic acids and the stabilizer is one or more phenolic compounds.

6. The inorganic and organic insulating polymer of claim 4, wherein the catalyst includes a strong acid and a weak acid.

7. The inorganic and organic insulating polymer of claim 4, wherein the one or more phenolic compounds include t-butyl hydroquinone, methyl hydroquinone, tert-butyl catechol, phenothiazine, or combinations thereof.

8. The inorganic and organic insulating polymer of claim 1, wherein the one or more multifunctional acrylate or methacrylate monomers are selected from a cyclic ether acrylate, a cyclic ether methacrylate, alkoxy acrylates, alkoxy diacrylates, alkoxy methacrylates, alkoxy dimethacrylates, and combinations thereof.

9. The inorganic and organic insulating polymer of claim 8, wherein the one or more multifunctional acrylate or methacrylate monomers are selected from 1,4-butanediol diacrylate or dimethacrylate, tetrahydrofurfuryl acrylate or methacrylate, and combinations thereof.

10. The inorganic and organic insulating polymer of claim 1, wherein the initiator is a peroxide.

11. The inorganic and organic insulating polymer of claim 10, wherein the initiator is benzoyl peroxide, methyl ethyl ketone peroxide, cumene hydro peroxide, or combinations thereof.

* * * * *